United States Patent
Wang et al.

(10) Patent No.: US 12,127,143 B2
(45) Date of Patent: Oct. 22, 2024

(54) CONSISTENT CLOCK SYNCHRONIZATION FREQUENCY OFFSET ESTIMATION METHOD BASED ON SEQUENTIAL LEAST SQUARES

(71) Applicant: CHONGQING UNIVERSITY OF POSTS AND TELECOMMUNICATIONS, Chongqing (CN)

(72) Inventors: Heng Wang, Chongqing (CN); Pengfei Gong, Chongqing (CN); Ping Wang, Chongqing (CN)

(73) Assignee: Chongqing University of Posts and Telecommunications, Chongqing (CN)

( * ) Notice: Subject to any disclaimer, the term of this patent is extended or adjusted under 35 U.S.C. 154(b) by 0 days.

(21) Appl. No.: 17/775,298

(22) PCT Filed: Jun. 15, 2021

(86) PCT No.: PCT/CN2021/099979
§ 371 (c)(1),
(2) Date: May 8, 2022

(87) PCT Pub. No.: WO2022/236916
PCT Pub. Date: Nov. 17, 2022

(65) Prior Publication Data
US 2024/0163821 A1   May 16, 2024

(30) Foreign Application Priority Data
May 10, 2021 (CN) .......................... 202110506223.5

(51) Int. Cl.
*H04L 7/00* (2006.01)
*H04W 56/00* (2009.01)

(52) U.S. Cl.
CPC ..... *H04W 56/0035* (2013.01); *H04W 56/004* (2013.01)

(58) Field of Classification Search
CPC .................. H04W 56/0035; H04W 56/004
See application file for complete search history.

(56) References Cited

U.S. PATENT DOCUMENTS

2016/0330012 A1*  11/2016  Liu ................ H04L 43/087
2017/0286675 A1*  10/2017  Shin .............. H04L 63/1416

\* cited by examiner

*Primary Examiner* — Jamal Javaid
(74) *Attorney, Agent, or Firm* — Michael D. Eisenberg

(57) ABSTRACT

The present invention relates to a consensus-based clock synchronization skew estimation method based on sequential least squares, and belongs to the technical field of wireless sensor networks. The method is to establish a relationship model of clock information and time delay between nodes with respect to a bounded random communication time delay scenario subject to arbitrary distribution, fully consider all clock information received by a node from a neighbor, build a clock parameter estimation model and a cost function based on a least squares principle, iteratively estimate relative clock skew by a sequential least squares method, and update logical clock parameters of nodes by a consensus-based clock synchronization method, so as to achieve global clock consistency of all nodes in a network in a completely distributed way. The present invention improves accuracy of relative skew estimation, effectively reduces storage overhead of the nodes, and improves robustness of a consensus-based synchronization algorithm against communication time delay.

6 Claims, 2 Drawing Sheets

CONSISTENT CLOCK SYNCHRONIZATION FREQUENCY OFFSET ESTIMATION METHOD BASED ON SEQUENTIAL LEAST SQUARES

FIELD OF INVENTION

The present invention belongs to the technical field of wireless sensor networks, and relates to a consensus-based clock synchronization skew estimation method based on sequential least squares.

BACKGROUND

Wireless sensor networks are a kind of typical distributed wireless communication networks. Due to functions such as information collection, data processing and wireless communication, the wireless sensor networks have very important theoretical significance and application value in the fields of environmental monitoring, medical treatment & health, industrial production, dangerous environment, etc. Time synchronization is an important prerequisite for effective application of the wireless sensor networks, and a plurality of applications such as protocol running, TDMA scheduling, energy management and target location need to be run on the basis of keeping time of nodes in a network synchronous. As a core for cooperative control research of a multi-agent system, a consensus-based synchronization protocol is an effective method for solving a problem of cooperative control of a distributed network. Introducing a consensus theory into clock synchronization of a wireless sensor network can improve robustness and expansibility of a synchronization method. Therefore, researching a clock synchronization method based on consensus to solve a problem of distributed synchronization has a good development prospect.

In a practical wireless sensor network scenario, random communication time delay in clock synchronization is usually unavoidable. The random communication time delay can be modeled as Gaussian distribution, exponential distribution and gamma distribution for different applications. Considering presence of communication time delay, early proposed consensus-based clock synchronization methods which ignore influence of time delay cannot effectively guarantee convergence of synchronization between network nodes. Relative skew estimation plays an important role in a clock synchronization method, because an estimated value thereof can be directly used in logical clock parameter compensation, thus influencing synchronization accuracy and convergence performance of a clock synchronization algorithm. In recent years, some consensus-based clock synchronization algorithms have suppressed influence of communication time delay on clock parameter estimation and consensus synchronization by improving relative skew estimation methods, thus effectively solving a problem that synchronization cannot be converged in the presence of time delay. However, such consensus-based clock synchronization methods have two limitations: first, due to limitation of a specific type of random time delay distribution, the methods cannot be applied to an actual network environment with variable time delay; second, the skew estimation methods used are relatively simple, so clock information received by the nodes cannot be fully utilized to estimate a more accurate skew, and performance of time synchronization is also limited.

Therefore, a novel relative skew estimation method which can solve a problem of consensus-based clock synchronization in wireless sensor networks and has low storage requirements and high estimation accuracy in an arbitrary bounded random communication time delay scenario is urgently needed.

DISCLOSURE OF THE INVENTION

In view of this, the purpose of the present invention is to provide a consensus-based clock synchronization skew estimation method based on sequential least squares. Aiming at problems that consensus-based time synchronization cannot be converged in the presence of arbitrary random communication time delay and clock information is not fully utilized in skew estimation, concentrating on an efficient and practical data processing optimization method, and considering high synchronization accuracy and low node storage requirements, relative skew is estimated by a sequential least squares method, and estimation results are applied to a clock synchronization method based on consensus to perform logical clock parameter compensation, so that convergence performance of a consensus-based time synchronization method in the presence of time delay is effectively guaranteed, and effects of adapting to different types of delay scenarios and improving synchronization accuracy of an entire network can be achieved at the same time.

To achieve the above purpose, the present invention provides following technical solution:

A consensus-based clock synchronization frequency offset estimation method based on sequential least squares, which is to establish a relationship model of clock information and time delay between nodes with respect to a bounded random communication time delay scenario subject to arbitrary distribution, fully consider all clock information received by a node from a neighbor, build a clock parameter estimation model and a cost function based on a least squares principle, iteratively estimate a relative skew by a sequential least squares method, and update logical clock parameters of nodes by a consensus-based clock synchronization method, so as to achieve global clock consensus of all nodes in a network in a completely distributed way. The method comprises the following specific steps:

S1: Establishing a relationship model of clock information and time delay between nodes with respect to a bounded random communication time delay scenario subject to arbitrary distribution;

S2: Establishing a relative relationship of any set of local clock information according to a communication time delay relationship;

S3: Building a clock parameter estimation model and a cost function based on a least squares principle according to the relative relationship of the clock information;

S4: Iteratively estimating a relative skew by a sequential least squares method, and updating logical clock parameters of nodes by a consensus-based clock synchronization method; after the relative skew between nodes are estimated, periodically repeating operations of estimating a relative skew and updating logical clock parameters until logical clocks of the nodes in an entire network are synchronized.

Further, in step S1, a relationship model of clock information and time delay between nodes is established, specifically comprising: assuming that any sensor node i in a network periodically broadcasts a local clock $\tau_i(t_k^i)$ and relevant synchronization clock information at an interval T, and a neighbor node j thereof receives and records a local clock $\tau_j(t_k^{id})$ thereof at a receiving moment to obtain a communication time delay relationship between nodes under real time scale:

$$d_{ij}(t_k^{id}) = t_k^{id} - t_k^i$$

Where $d_{ij}(t_k^{id})$ represents random communication time delay subject to arbitrary distribution, which is non-negative and has an upper bound of constant $D_d$.

Further, in step S2, a relative relationship of any set of local clock information is established according to a communication time delay relationship, specifically comprising: after the neighbor node j receives n+1 pieces of synchronization clock information from the node i, obtaining n+1 sets of local clock observed values $\{\tau_i(t_k^i), \tau_j(t_k^{id})\}_{k=0}^n$, and establishing the relative relationship of any set of local clock information according to the communication time delay relationship:

$$\tau_j(t_k^{id}) = \alpha_{ij}\tau_i(t_k^i) + \beta_{ij} + \alpha_j d_{ij}(t_k^{id})$$

Where $\alpha_{ij}$ and $\beta_{ij}$ respectively represent a relative skew and a relative offset of the node i relative to the node j, and $\alpha_j$ represents a local clock skew of the node j.

Further, in step S3, a clock parameter estimation model and a cost function based on a least squares principle are built, specifically comprising: processing communication time delay items according to the relative relationship of the clock information in order to reduce influence of time delay on parameter estimation and clock synchronization, and considering a time delay part in a formula of the relative relationship of the local clock information as an error function:

$$e_{ij}(t_k^{id}) = \tau_j(t_k^{id}) - \alpha_{ij}\tau_i(t_k^i) - \beta_{ij}$$

Extending the error function to all local clock observations, and then processing an error by a least squares principle, so as to obtain the following cost function $J(\alpha_{ij}, \beta_{ij})$ containing the clock parameters $\alpha_{ij}$ and $\beta_{ij}$:

$$J(\alpha_{ij}, \beta_{ij}) = \sum_{k=0}^{n}\left(\tau_j(t_k^{id}) - \alpha_{ij}\tau_i(t_k^i) - \beta_{ij}\right)^2$$

Obtaining estimations of the relative skew and the relative offset by minimizing the cost function.

Further, in step S4, relative skew estimation based on a least squares principle is a value obtained by minimizing the cost function $J(\alpha_{ij}, \beta_{ij})$, the cost function contains all clock information received and recorded, and as time synchronization progresses, more and more clock information $\{\tau_i(t_k^i), \tau_j(t_k^{id})\}$ needs to be stored by the nodes. A sensor node with a limited storage capacity will not have enough memory space to keep all the clock information; in this scenario, a relative clock skew is iteratively estimated by a sequential least squares method, so as to effectively reduce storage overhead of the sensor node, specifically comprising following steps:

S41: In a first round of synchronization, receiving and storing, by the node j, two sets of clock information $\{\tau_i(t_0^i), \tau_j(t_0^{id})\}$ and $\{\tau_i(t_1^i), \tau_j(t_1^{id})\}$, and obtaining estimated values $\hat{\alpha}_{ij}(1)$ and $\hat{\beta}_{ij}(1)$ in the first round of synchronization directly by a standard least squares method:

$$\hat{\alpha}_{ij}(1) = \frac{\tau_j(t_1^{id}) - \tau_j(t_0^{id})}{T}$$

$$\hat{\beta}_{ij}(1) = \tau_j(t_0^{id})$$

In addition, to start a process of iteratively estimating clock parameters, setting a covariance matrix in the first round of synchronization to be:

$$\Sigma(1) = (H^T(1)H(1))^{-1}$$

Where $H(1) = [h(0)\ h(1)]^T$, $h(0) = [\tau_i(t_0^i)\ 1]^T$ and $h(1) = [\tau_i(t_1^i)\ 1]^T$;

S42: For a $m^{th}$ (m=2, 3, 4, ..., n) round of synchronization, storing, by the node j, only clock information $\{\tau_i(t_m^i), \tau_j(t_m^{id})\}$ received in the current round, estimated values $\hat{\alpha}_{ij}(m-1)$ and $\hat{\beta}_{ij}(m-1)$ of the clock parameters calculated in a previous round, and a covariance matrix $\Sigma(m-1)$ generated in the previous round, and then iteratively estimating a relative skew and a relative offset in the current round of synchronization by the sequential least squares method;

Estimation updating: $\hat{\theta}(m) = \hat{\theta}(m-1) + K(m)(\tau_j(t_m^{id}) - h^T(m)\hat{\theta}(m-1))$ Gain updating: $K(m) = \dfrac{\Sigma(m-1)h(m)}{1 + h^T(m)\Sigma(m-1)h(m)}$ Covariance updating: $\Sigma(m) = (I_2 - K(m)h^T(m))\Sigma(m-1)$ Where $\hat{\theta}(m)$ represents the estimated values of the clock parameters in the $m^{th}$ round, i.e., $\hat{\theta}(m) = [\hat{\alpha}_{ij}(m)\ \hat{\beta}_{ij}(m)]^T$, $h(m) = [\tau_i(t_m^i)\ 1]^T$, $K(m)$ represents a gain matrix in the $m^{th}$ round, $\Sigma(m)$ represents a covariance matrix of the $m^{th}$ round of parameter estimation, and $I_2$ is a second-order unit matrix. Thus it can be seen that, according to the skew estimation method based on sequential least squares, the node only needs to store the clock information of the current round of synchronization and the estimated information obtained from the previous round.

Further, in step S4, the logical clock parameters include: logical skew compensation and logical offset compensation.

The present invention has the following beneficial effects:

1) In the present invention, bounded communication time delay subject to an arbitrary distribution type is considered, a clock information model is established based on a time delay relationship between nodes, and a relative skew is estimated by a sequential least squares method suitable for any distribution, therefore robustness of consensus-based clock synchronization against multiple types of time delay is improved.

2) In the present invention, all clock information is processed directly based on a least squares principle, a cost function is built according to relationship of each pair of clock information, and a more accurate estimated value of relative skew is obtained by minimizing the cost function that contains all clock information, therefore convergence performance of consensus-based clock synchronization is effectively guaranteed.

3) In the present invention, special consideration is taken to using the sequential least squares method to cope with the scenario that a node has a limited storage capacity and cannot store all the clock information recorded, relative clock relationship of nodes and iterable calculation characteristic of a standard least squares method are utilized, so that the node does not need to store all clock information received in each round of synchronization estimation, but only needs to store the clock information received in the current round of synchronization, relevant estimated values in the previous round of synchronization, and the covariance matrix calculated in the previous round, and storage and calculation overhead of the node can be effectively reduced on the premise of obtaining high-accuracy clock parameter estimations.

Other advantages, objectives and features of the present invention will be illustrated in the following description to some extent, and will be apparent to those skilled in the art based on the following investigation and research to some extent, or can be taught from the practice of the present invention. The objectives and other advantages of the present invention can be realized and obtained through the following description.

DESCRIPTION OF THE DRAWINGS

To enable the purpose, the technical solution and the advantages of the present invention to be more clear, the present invention will be preferably described in detail below in combination with the drawings, wherein.

DETAILED DESCRIPTION OF THE INVENTION

Embodiments of the present invention are described below through specific embodiments. Those skilled in the art can understand other advantages and effects of the present invention easily through the disclosure of the description. The present invention can also be implemented or applied through additional different specific embodiments. All details in the description can be modified or changed based on different perspectives and applications without departing from the spirit of the present invention. It should be noted that the figures provided in the following embodiments only exemplarily explain the basic conception of the present invention, and if there is no conflict, the following embodiments and the features in the embodiments can be mutually combined.

Figure 1:
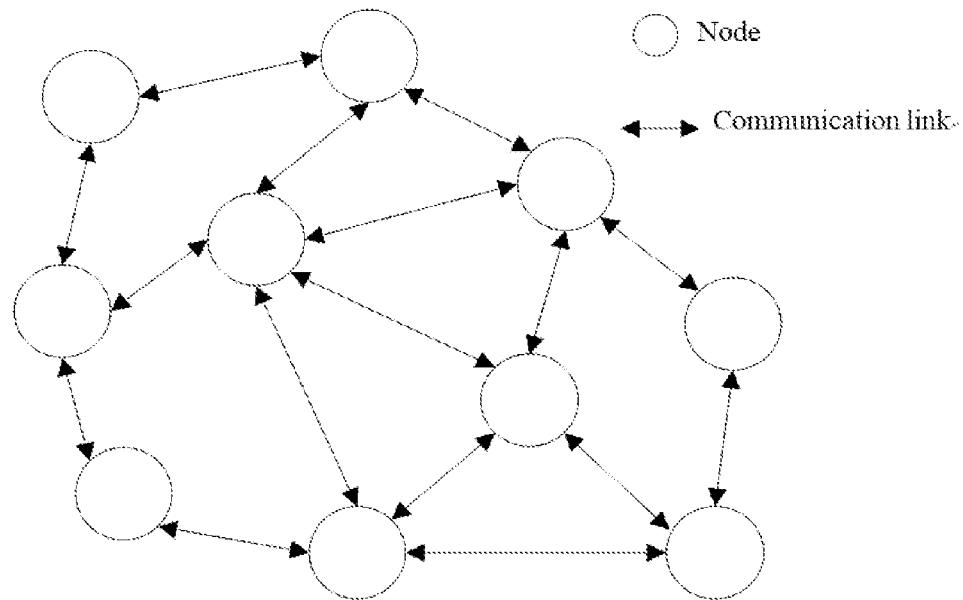
FIG. 1 is a diagram showing a communication topology of a distributed wireless sensor network.
Figure 2:
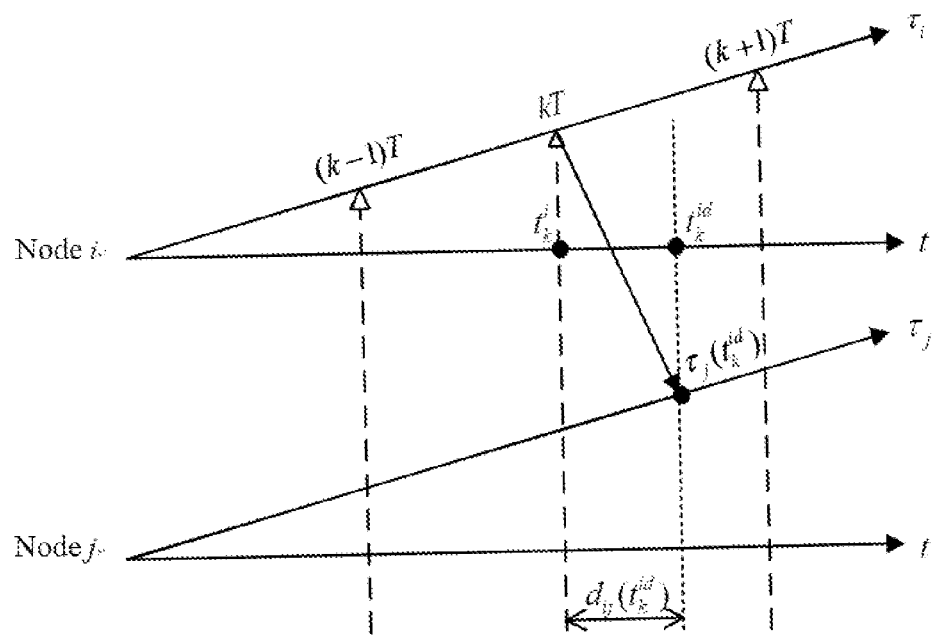
FIG. 2 is a schematic diagram of clock synchronization information exchange between nodes under time delay.
Figure 3:
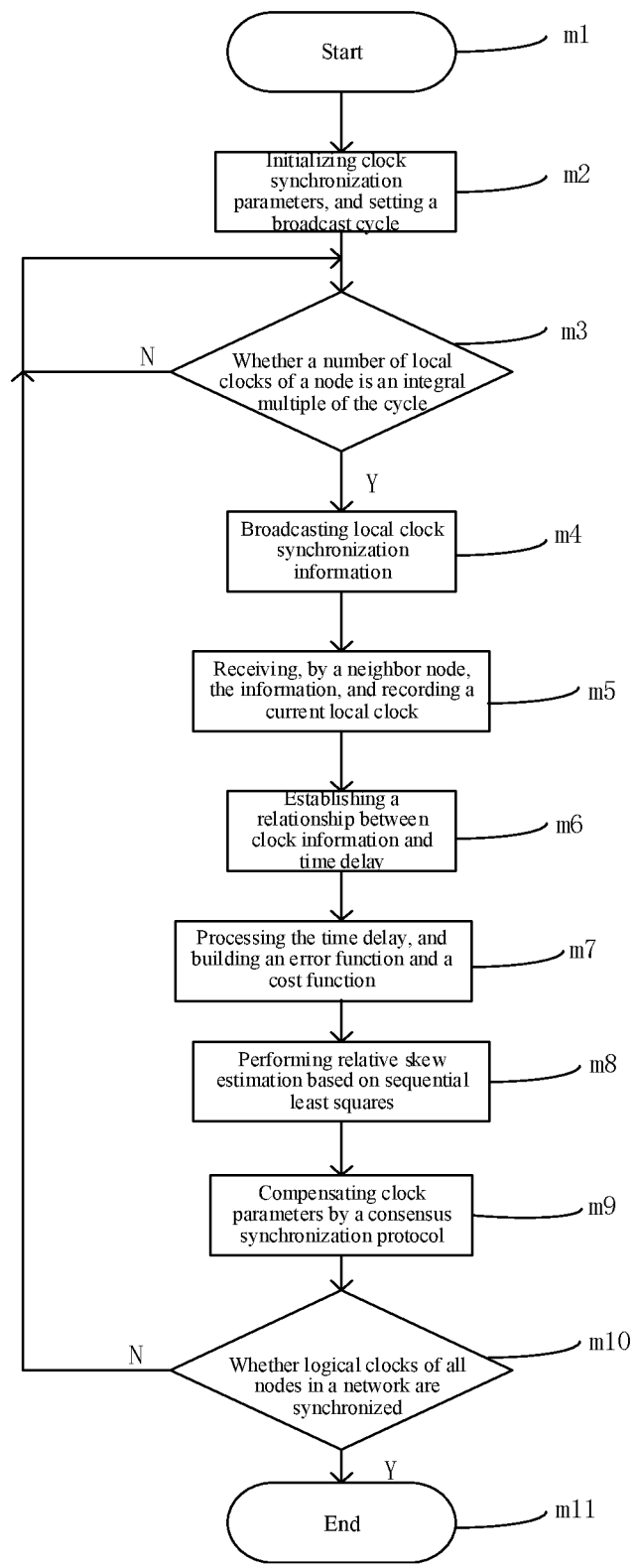
FIG. 3 is a flow chart of a consistent synchronization method according to a skew estimation method based on sequential least squares in an embodiment.

Referring to FIGS. 1-3, FIG. 1 is a diagram showing a communication topology of a distributed wireless sensor network considered in the present invention. As shown in FIG. 1, each sensor node randomly distributed in a network periodically broadcasts local clock information, and receives clock information broadcast by other nodes within a communication range thereof at the same time. A communication topology of the wireless sensor network can be represented as a strongly connected directed graph $G=(N,E)$, where $N=\{1, 2, \ldots, N\}$ represents a set of senor nodes in the network, and $E \subseteq N \times N$ represents a set of reliable communication links. In addition, $N_i=\{j|(i,j) \in E, i \neq j\}$ is used to represent a set of all neighbor nodes within a communication range of a node i, where $(i,j) \in E$ represents that a node j can successfully receive clock synchronization information from the node i.

FIG. 2 represents a process of clock synchronization information exchange between nodes under time delay. The schematic diagram takes synchronization exchange of two adjacent nodes i and j on a local time scale and a real time scale as an example, the node i periodically transmits local clock information $\tau_i(t_k^i)$ at an interval T, and the neighbor node j thereof receives the clock information from the node i, saves the information immediately and records a current local clock $\tau_j(t_k^{id})$ thereof. For a $k^{th}$ round of clock information transmission, communication time delay between the nodes i and j is modeled as a difference between a sending moment $t_k^i$ of the node i on the real time scale and a receiving moment $t_k^{id}$ of the node j on the real time scale:

$$d_{ij}(t_k^{id}) = t_k^{id} - t_k^i$$

Where $d_{ij}(t_k^{id})$ is considered as a positive random variable with an upper bound of a fixed value $D_d$, and the upper bound is usually set to be a maximum measurable round-trip time. Thus, the neighbor node j establishes a relative relationship of a clock information pair $\{\tau_i(t_k^i), \tau_j(t_k^{id})\}$ according to the time delay model:

$$\tau_j(t_k^{id}) = \alpha_{ij}\tau_i(t_k^i) + \beta_{ij} + \alpha_j d_{ij}(t_k^{id})$$

Where $\alpha_{ij}$ and $\beta_{ij}$ respectively represent a relative skew and a relative offset of the node i relative to the node j, and $\alpha_j$ represents a local clock skew of the node j. In order to reduce influence of time delay on relative skew estimation, a time delay part in a formula of a clock relationship is regarded as an error function $e_{ij}(t_k^{id})$:

$$e_{ij}(t_k^{id}) = \alpha_j d_{ij}(t_k^{id}) = \tau_j(t_k^{id}) - \alpha_{ij}\tau_i(t_k^i) - \beta_{ij}$$

The error function is extended to n+1 pairs of clock information recorded, and a cost function $J(\alpha_{ij}, \beta_{ij})$ can be obtained by using a standard least squares method to synchronously process corresponding errors of all the clock information:

$$J(\alpha_{ij}, \beta_{ij}) = \sum_{k=0}^{n} \left(\tau_j(t_k^{id}) - \alpha_{ij}\tau_i(t_k^i) - \beta_{ij}\right)^2$$

Then is a process of minimizing the cost function to obtain estimated values of parameters, which is to obtain a partial derivative of $J(\alpha_{ij}, \beta_{ij})$ with respect to unknown parameters $\alpha_{ij}$ and $\beta_{ij}$ first, let an expression result of the partial derivative obtained be zero, and put two partial derivative equations and a periodic broadcast moment $\tau_i(t_k^i)=kT$ together to obtain estimations $\hat{\alpha}_{ij}$ and $\hat{\beta}_{ij}$:

$$\hat{\alpha}_{ij}(n) = \frac{12\sum_{k=0}^{n} kT_j(t_k^{id}) - 6n\sum_{k=0}^{n} \tau_j(t_k^{id})}{Tn(n+1)(n+2)}$$

$$\hat{\beta}_{ij}(n) = \frac{\sum_{k=0}^{n} \tau_j(t_k^{id}) - \hat{\alpha}_{ij}(n)\sum_{k=0}^{n} \tau_j(t_k^i)}{n+1}$$

As all the recorded clock information is taken into account, the obtained relative skew estimation $\hat{\alpha}_{ij}$ has a relatively high accuracy, which can effectively ensure convergence performance of a consensus-based clock synchronization algorithm in the presence of communication time delay when applied to the algorithm.

It can be seen from an expression of the relative skew estimation derived by the standard least squares method that the node needs to store all the recorded clock information for parameter estimation, and amount of calculation is relatively complicated. Obviously, as the number of rounds of synchronization increases, the amount of synchronization clock information received will increase; for a scenario that a sensor node has limited storage capacity and calculation capability and cannot store all the recorded clock information, it is necessary to take special consideration to reduce storage overhead and design a completely equivalent sequential least squares estimation method. As the cost function contains two parameters which need to be estimated, at least two pieces of clock information are needed as initialization points of estimation; at the same time, the parameters to be estimated are denoted as a vector $\theta=[\alpha_{ij}\ \beta_{ij}]^T$ for the convenience of using during sequential least squares estimation. In a first round of synchronization, the node j needs to record two pieces of clock information $\{\tau_i(t_0^i), \tau_j(t_0^{id})\}$ and $\{\tau_i(t_1^i), \tau_j(t_1^{id})\}$, then the obtained expressions $\hat{\alpha}_{ij}(n)$ and $\hat{\beta}_{ij}(n)$ are processed by the standard least squares method, and estimated values of the parameters in the first round of synchronization can be calculated:

$$\hat{\theta}(1) = \left[\frac{\tau_j(t_1^{id}) - \tau_j(t_0^{id})}{T}\quad \tau_j(t_0^{id})\right]^T$$

Where $\hat{\theta}(1)[\hat{\alpha}_{ij}(1)\ \hat{\beta}_{ij}(1)]^T$ represents the estimated values of the clock parameters in the first round. Whereas in a $m^{th}$ (m=2, 3, 4, ..., n) round of synchronization, the node j only needs to store clock information $\{\tau_i(t_m^i), \tau_j(t_m^{id})\}$ received in the current round, estimated values $\hat{\alpha}_{ij}(m-1)$ and $\hat{\beta}_{ij}(m-1)$ calculated in a previous round, and a covariance matrix used in an iterative estimation process, and a relative skew and a relative offset in the current round are iteratively estimated by the sequential least squares method:

$\hat{\theta}(m)=\hat{\theta}(m-1)+K(m)(\tau_j(t_m^{id})-h^T(m)\hat{\theta}(m-1))$   Estimation updating:

Gain updating: $K(m) = \dfrac{\Sigma(m-1)h(m)}{1 + h^T(m)\Sigma(m-1)h(m)}$ $\Sigma(n)=(I_2-K(n)h^T(n))\Sigma(n-1)$   Covariance updating:

Where $\hat{\theta}(m)=[\hat{\alpha}_{ij}(m)\ \hat{\beta}_{ij}(m)]^T$ represents the estimated values of the clock parameters in the $m^{th}$ round, $h(m)=[\tau_i(t_m^i)\ 1]^T$, $K(m)$ represents a gain matrix in the $m^{th}$ round, $\tau(m)$ represents a covariance matrix of the $m^{th}$ round of parameter estimation, and $I_2$ is a second-order unit matrix. In addition, to start a process of iteratively estimating clock parameters, a covariance matrix in the first round is given as $\tau(1)=(H^T(1)H(1))^{-1}$, where $H(1)=[h(0)\ h(1)]^T$. Thus it can be seen obviously that, when the relative skew is estimated by the sequential least squares method, the node only needs to store a small amount of clock information and relevant iteration information.

Embodiment 1

FIG. 3 is a flow chart of a consistent clock synchronization skew estimation method based on sequential least squares in an embodiment. This embodiment provides a relative skew estimation method based on sequential least squares used for average consensus synchronization, as shown in FIG. 3, specifically comprising following steps:

m1: Starting a clock synchronization process.

m2-m4: Initializing clock synchronization parameters including a relative skew and a relative offset, setting a synchronization broadcast cycle, determining, by a node, whether a periodic broadcast condition is met, if so, broadcasting clock synchronization messages thereof, otherwise waiting until the broadcast condition is met.

m5-m6: Receiving, by a neighbor node, synchronization clock information, recording a local clock value thereof at a receiving moment, and establishing a relative clock relationship between nodes in the presence of communication time delay by the clock information of the current round.

m7: Processing a time delay part in the clock relationship by the neighbor node, and building an error function and a cost function by minimizing influence of time delay on relative skew estimation.

m8: In case of a first round of synchronization, estimating, by the node, the relative skew and the relative offset in the first round of synchronization according to the cost function and the recorded clock information, and calculating a covariance matrix in the first round of synchronization iteration; in case of a $(m>1)^{th}$ round of synchronization, iteratively estimating, by the node, the relative skew in the current round of synchronization using a sequential least squares method according to the clock information received in the current round and the estimated information stored in a previous round of synchronization.

m9: Updating logical clock parameter compensation, mainly including logical skew compensation and logical offset compensation, by a synchronization protocol based on average consensus.

m10-m11: Judging whether a synchronization termination condition is met by logical clocks of all nodes in a network, including whether a logical skew error is consensus, whether a logical offset error is maintained within a relatively low range, and whether a logical clock error is within an acceptable range; ending if a desired synchronization effect is achieved; otherwise, monitoring clock synchronization information, and updating the synchronization processes such as relative skew estimation and logical clock parameter compensation, until the synchronization termination condition is met.

After the relative skew between nodes is estimated, applying the relative offset to a consensus synchronization method to compensate logical clock parameters of nodes, such as skew compensation and offset compensation based on an average consensus protocol. Periodically repeating the processes of relative skew estimation, logical offset compensation and logical offset compensation until the logical clocks of all nodes in a distributed network are synchronized.

Finally, it should be noted that the above embodiments are only used for describing, rather than limiting the technical solution of the present invention. Although the present invention is described in detail with reference to the preferred embodiments, those ordinary skilled in the art shall understand that the technical solution of the present invention can be amended or equivalently replaced without departing from the purpose and the scope of the technical solution. The amendment or equivalent replacement shall be covered within the scope of the claims of the present invention.

The invention claimed is:

1. A consensus-based clock synchronization relative skew estimation method based on sequential least squares, characterized in that the method specifically comprises following steps:

S1: establishing a relationship model of clock information and time delay between nodes with respect to a bounded random communication time delay scenario subject to arbitrary distribution;

S2: establishing a relative relationship of any set of local clock information according to a communication time delay relationship;

S3: building a clock parameter estimation model and a cost function based on a least squares principle according to the relative relationship of the clock information;

S4: iteratively estimating relative clock skew by a sequential least squares method, and updating logical clock parameters of nodes by an consensus-based clock synchronization method; after the relative skews between nodes are estimated, periodically repeating operations of estimating a relative skew and updating logical clock parameters until logical clocks of the nodes in an entire network are synchronized.

2. The consensus-based clock synchronization skew estimation method as claimed in claim 1, characterized in that: in step S1, a relationship model of clock information and time delay between nodes is established, specifically comprising:

assuming that any sensor node i in a network periodically broadcasts a local clock $\tau_i(t_k^i)$ and relevant synchronization clock information at an interval T, and a neighbor node j thereof receives and records a local clock $\tau_j(t_k^{id})$ thereof at a receiving moment to obtain a communication time delay relationship between nodes under real time scale:

$$d_{ij}(t_k^{id}) = t_k^{id} - t_k^i$$

where $d_{ij}(t_k^{id})$ represents random communication time delay subject to arbitrary distribution, which is non-negative and has an upper bound of constant $D_d$.

3. The consensus-based clock synchronization skew estimation method as claimed in claim 2, characterized in that: in step S2, a relative relationship of any set of local clock information is established according to a communication time delay relationship, specifically comprising: after the neighbor node j receives n+1 pieces of synchronization clock information from the node i, obtaining n+1 sets of local clock observed values $\{\tau_i(t_k^i), \tau_j(t_k^{id})\}_{k=0}^n$, and establishing the relative relationship of any set of local clock information according to the communication time delay relationship:

$$\tau_j(t_k^{id}) = \alpha_{ij}\tau_i(t_k^i) + \beta_{ij} + \alpha_j d_{ij}(t_k^{id})$$

where $\alpha_{ij}$ and $\beta_{ij}$ respectively represent a relative skew and a relative offset of the node i relative to the node j, and $\alpha_j$ represents a local clock skew of the node j.

4. The consensus-based clock synchronization skew estimation method as claimed in claim 3, characterized in that: in step S3, a clock parameter estimation model and a cost function based on a least squares principle are built, specifically comprising: processing communication time delay items according to the relative relationship of the clock information, and considering a time delay part in a formula of the relative relationship of the local clock information as an error function:

$$e_{ij}(t_k^{id}) = \tau_j(t_k^{id}) - \alpha_{ij}\tau_i(t_k^i) - \beta_{ij}$$

extending the error function to all local clock observations, and then processing an error by a least squares principle, so as to obtain the following cost function $J(\alpha_{ij}, \beta_{ij})$ containing the clock parameters $\alpha_{ij}$ and $\beta_{ij}$:

$$J(\alpha_{ij}, \beta_{ij}) = \sum_{k=0}^n \left(\tau_j(t_k^{id}) - \alpha_{ij}\tau_i(t_k^i) - \beta_{ij}\right)^2$$

obtaining estimations of the relative skew and the relative offset by minimizing the cost function.

5. The consensus-based clock synchronization skew estimation method as claimed in claim 4, characterized in that: in step S4, a relative clock skew is iteratively estimated by a sequential least squares method, specifically comprising following steps:

S41: in a first round of synchronization, receiving and storing, by the node j, two sets of clock information $\{\tau_i(t_0^i), \tau_j(t_0^{id})\}$ and $\{\tau_i(t_1^i), \tau_j(t_1^{id})\}$, and obtaining estimated values $\hat{\alpha}_{ij}(1)$ and $\hat{\beta}_{ij}(1)$ in the first round of synchronization directly by a standard least squares method:

$$\hat{\alpha}_{ij}(1) = \frac{\tau_j(t_1^{id}) - \tau_j(t_0^{id})}{T}$$

$$\hat{\beta}_{ij}(1) = \tau_j(t_0^{id})$$

in addition, to start a process of iteratively estimating clock parameters, setting a covariance matrix in the first round of synchronization to be:

$$\Sigma(1) = (H^T(1)H(1))^{-1}$$

where $H(1) = [h(0)\ h(1)]^T$, $h(0) = [\tau_i(t_0^i)\ 1]^T$ and $h(1) = [\tau_i(t_1^i)\ 1]^T$;

S42: for a $m^{th}$ (m=2, 3, 4, ..., n) round of synchronization, storing, by the node j, only clock information $\{\tau_i(t_m^i), \tau_j(t_m^{id})\}$ received in the current round, estimated values $\hat{\alpha}_{ij}(m-1)$ and $\hat{\beta}_{ij}(m-1)$ of the clock parameters calculated in a previous round, and a covariance matrix $\Sigma(m-1)$ generated in the previous round, and then iteratively estimating a relative clock skew and a relative clock offset in the current round of synchronization by the sequential least squares method;

$$\hat{\theta}(m) = \hat{\theta}(m-1) + K(m)(\tau_j(t_m^{id}) - h^T(m)\hat{\theta}(m-1)) \quad \text{estimation updating:}$$

gain updating: $K(m) = \dfrac{\Sigma(m-1)h(m)}{1 + h^T(m)\Sigma(m-1)h(m)}$ $\Sigma(m) = (I_2 - K(m)h^T(m))\Sigma(m-1)$ covariance updating:

where $\hat{\theta}(m)$ represents the estimated values of the clock parameters in the $m^{th}$ round, i.e., $\hat{\theta}(m) = [\hat{\alpha}_{ij}(m)\ \hat{\beta}_{ij}(m)]^T$, $h(m) = [\tau_i(t_m^i)\ 1]^T$, $K(m)$ represents a gain matrix in the $m^{th}$ round, $\Sigma(m)$ represents a covariance matrix of the $m^{th}$ round of parameter estimation, and $I_2$ is a second-order unit matrix.

6. The consensus-based clock synchronization skew estimation method as claimed in claim 1, characterized in that: in step S4, the logical clock parameters include: logical skew compensation and logical offset compensation.

* * * * *